US012109567B2

United States Patent
Berweger et al.

(10) Patent No.: US 12,109,567 B2
(45) Date of Patent: Oct. 8, 2024

(54) ROBOTIC LIQUID HANDLING SYSTEM

(71) Applicant: Tecan Trading AG, Männedorf (CH)

(72) Inventors: Christian Berweger, Zürich (CH);
Ermal Abdulahi, Oftringen (CH);
Mirco Brennwald, Stäfa (CH)

(73) Assignee: TECAN TRADING AG, Männedorf (CH)

( * ) Notice: Subject to any disclaimer, the term of this patent is extended or adjusted under 35 U.S.C. 154(b) by 183 days.

(21) Appl. No.: 17/511,021

(22) Filed: Oct. 26, 2021

(65) Prior Publication Data
US 2022/0126297 A1 Apr. 28, 2022

(30) Foreign Application Priority Data
Oct. 28, 2020 (EP) .................................... 20204248

(51) Int. Cl.
*B01L 3/00* (2006.01)
(52) U.S. Cl.
CPC ........... *B01L 3/523* (2013.01); *B01L 2200/16* (2013.01); *B01L 2300/044* (2013.01)
(58) Field of Classification Search
CPC ..... A61B 34/70; B01L 3/523; B01L 2200/16; B01L 2300/044; B25J 11/005; B25J 11/0005; G01N 3/58; G01N 35/0099; G01N 2035/0405
See application file for complete search history.

(56) References Cited

U.S. PATENT DOCUMENTS

| 9,457,474 B1 | 10/2016 | Lisso et al. |
| 2004/0055438 A1* | 3/2004 | Ours .................... B65B 69/0033 414/412 |
| 2006/0002827 A1* | 1/2006 | Curcio .............. B01L 3/502715 422/400 |
| 2011/0143947 A1 | 6/2011 | Chamberlin et al. |
| 2012/0048861 A1 | 3/2012 | Bernhard et al. |
| 2015/0127162 A1* | 5/2015 | Gotou .................... B25J 9/1612 700/259 |

(Continued)

FOREIGN PATENT DOCUMENTS

| EP | 0 752 105 | 4/2004 |
| WO | WO 02/090995 | 11/2002 |

*Primary Examiner* — Matthew D Krcha
*Assistant Examiner* — Austin Q Le
(74) *Attorney, Agent, or Firm* — NIXON & VANDERHYE P.C.

(57) ABSTRACT

A robotic liquid handling system may be provided comprising a robotic arm and a controller configured to control the robotic arm to position and operate the robotic arm in a workspace of the robotic liquid handling system. The controller may be configured to, as part of a liquid handling task, control the robotic arm to open a reagent reservoir, wherein the reagent reservoir has an opening which is sealed by a foil. The controller may be configured to control the robotic arm to open the foil by controlling the robotic arm to, using a cutting tip (260), cut at least two flaps in the foil, and using a blunt protrusion, push the at least two flaps downwards into the reagent reservoir to clear at least part of the opening of the reagent reservoir. Further aspects of the invention relate to a computer-implemented method for controlling a robotic arm and to an opening tool (200) comprising the cutting tip and the blunt protrusion.

19 Claims, 8 Drawing Sheets

(56) References Cited

U.S. PATENT DOCUMENTS

2015/0185116 A1* 7/2015 Brisebrat ............ G01N 35/026
                                                    83/660
2015/0251315 A1  9/2015 Brandenberger
2022/0063042 A1* 3/2022 Edwards ................ B25J 13/085

* cited by examiner

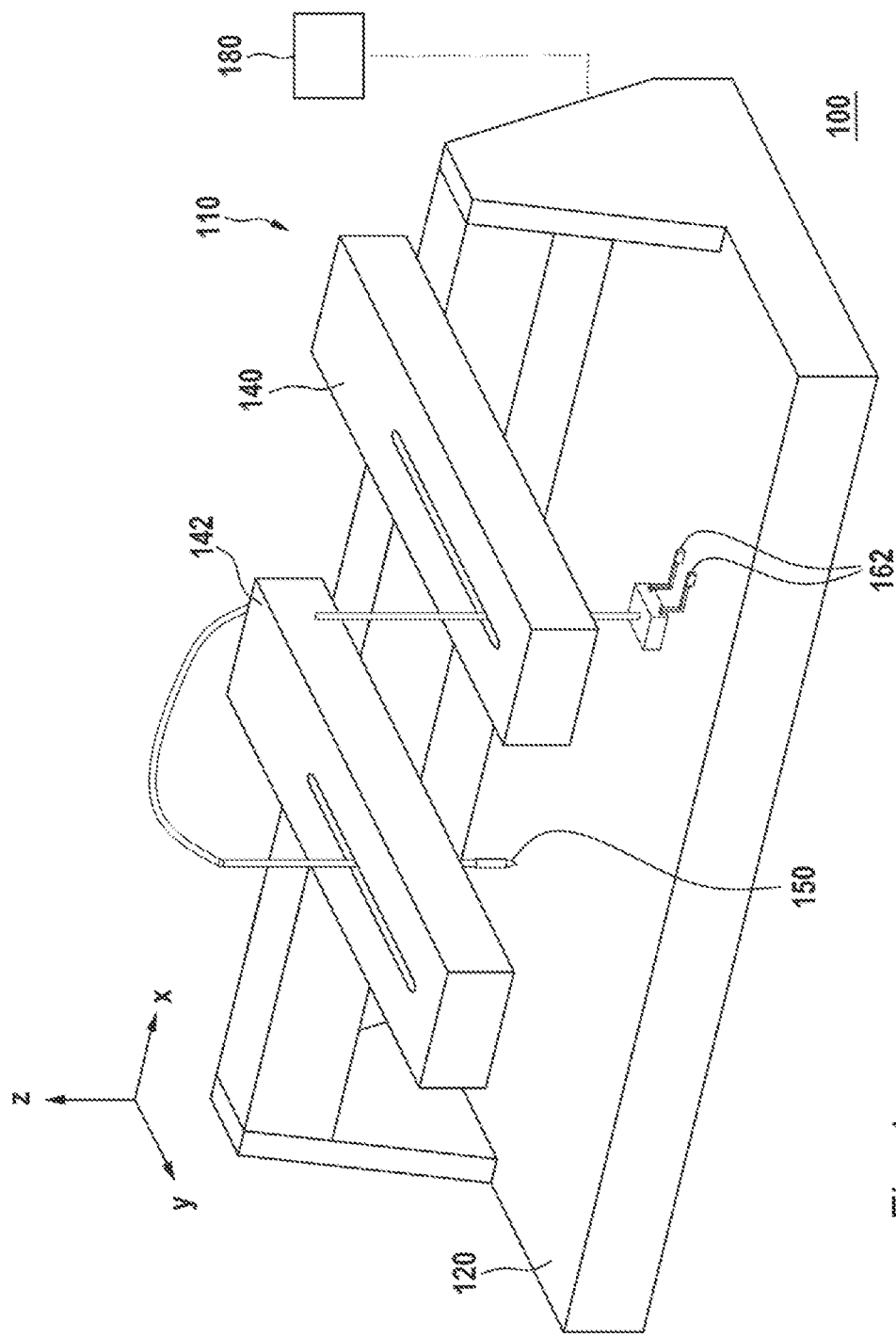

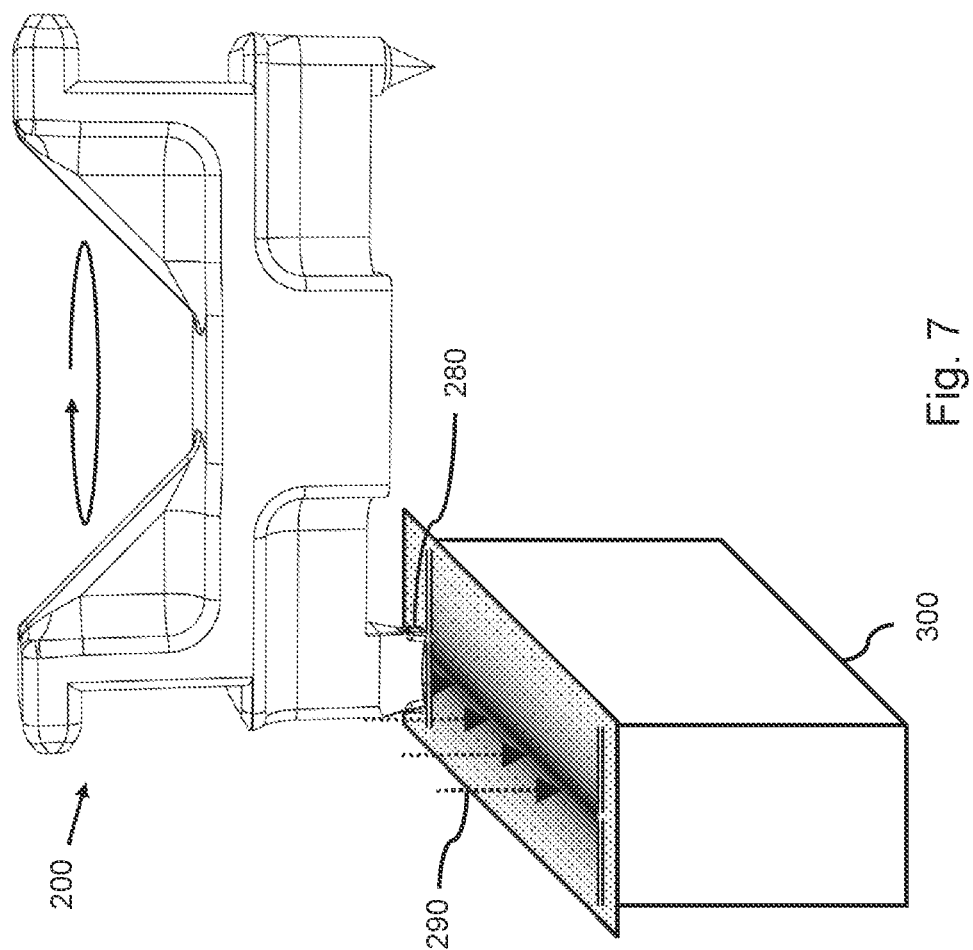

ROBOTIC LIQUID HANDLING SYSTEM

This application claims priority to EP patent application Ser. No. 20/204,248.7 filed Oct. 28, 2020, the entire contents of which are hereby incorporated by reference.

TECHNICAL FIELD

The invention relates to a robotic liquid handling system for performing liquid handling tasks in a laboratory environment, and to a computer-implemented method for controlling a robotic arm of a robotic liquid handling system. The invention further relates to a computer-readable medium comprising data representing a computer program for performing the computer-implemented method, and to a tool for being picked-up and used by the robotic arm as part of a liquid handling task.

BACKGROUND ART

Robotic liquid handling systems are well-known in the field of laboratory automation. Such robotic liquid handling systems may be used to automate liquid handling tasks, which may include actions such as handling of liquid containers, e.g., by picking-and-placing liquid containers on a worktable, and interacting with the samples contained in the containers, e.g., by dispensing liquids into a sample container or by pipetting actions. Various other types of liquid handling tasks and actions are known as well which may be at least partially automated by such robotic systems.

It is also known for a robotic liquid handling system to, in addition to handling liquid samples, also handle non-liquid samples or other objects. For example, robotic liquid handling systems are often equipped with a gripper as end-effector to move microplates, e.g. from a pipetting position to a shaker, in an incubator, to a thermocycler for PCR or in a microplate reader, or for moving or sorting test tubes.

An example of a robotic liquid handling system is an automated pipetting system, as for example described in US20150251315. Such an automated pipetting system, which may also be simply referred to as a 'pipetting robot', may comprise at least one pipette for aspirating and dispensing liquid samples. The robotic arm may be positioned under control of a controller to a given position and may be controlled to carry out a specific action at the given position. This may for example enable a pipette to be lowered into a container to aspirate a liquid therein or to dispense a liquid.

There exist various other examples of robotic liquid handling systems, which may in general comprise a work area for holding samples, e.g., in the form of a worktable, and at least one robotic arm which may be controllable to be positioned in a plane over the work area, e.g., in XY direction, and which may be moved towards and away from the work area by being positionable along a Z-axis perpendicular to the work area. The robotic arm may be controlled by a controller, whereby the robotic arm may be 'computer-controlled'. For example, the robotic arm may be controlled by a PC, workstation or server or by a microprocessor which may be integrated into or connected to the robotic arm. This way, the robotic arm may be controlled to perform a sequence of actions so as to be able to perform various liquid handling tasks.

A drawback of known robotic liquid handling systems is that they may be limited in their ability to automate certain types of actions in liquid handling tasks.

SUMMARY OF INVENTION

One of the objects of the invention is to provide a robotic liquid handling system, and a computer-implemented method for controlling a robotic arm of a robotic liquid handling system, to be able to perform one or more additional types of action when performing liquid handling tasks in a laboratory environment.

A first aspect of the invention provides a robotic liquid handling system, comprising:
  at least one robotic arm;
  a controller configured to control the robotic arm to position and operate the robotic arm in a workspace of the robotic liquid handling system;
  wherein the controller may be configured to, as part of a liquid handling task, control the robotic arm to open a reagent reservoir, wherein the reagent reservoir has an opening which is sealed by a foil, wherein the controller may be configured to control the robotic arm to open the foil by controlling the robotic arm to:
    using a cutting tip, cut at least two flaps in the foil;
    using a blunt protrusion, push the at least two flaps downwards into the reagent reservoir to clear at least part of the opening of the reagent reservoir.

A further aspect of the invention provides a computer-implemented method for controlling a robotic arm of a robotic liquid handling system, the method comprising controlling the robotic arm to open a reagent reservoir, wherein the reagent reservoir has an opening which is sealed by a foil, wherein the method may comprise controlling the robotic arm to open the foil by controlling the robotic arm to:
  using a cutting tip, cut at least two flaps in the foil;
  using a blunt protrusion, push the at least two flaps downwards into the reagent reservoir to clear at least part of the opening of the reagent reservoir.

A further aspect of the invention provides a computer-readable medium comprising transitory or non-transitory data representing a computer program, the computer program comprising instructions for causing a processor system to perform the computer-implemented method.

A further aspect of the invention provides an opening tool for opening a reagent reservoir, wherein the reagent reservoir has an opening which is sealed by a foil, the opening tool comprising:
  a main body with an elongated shape, the elongated shape having at each respective end of the elongated shape a surface to provide two opposing surfaces at which the opening tool can be laterally gripped and picked-up;
  an elongated surface which runs along a length of the main body, wherein the elongated surface comprises:
    at one end of the elongated surface, a cutting tip for piercing and cutting the foil of the reagent reservoir; and
    at an opposing end of the elongated surface, a blunt protrusion for pushing flaps cut into the foil downwards into the opening of the reagent reservoir, wherein the blunt protrusion is blunt in relation to the cutting tip.

The above aspects may involve a robotic liquid handling system which may be used in a workspace to handle samples. For example, the workspace may comprise a worktable, which in some embodiments may be part of the robotic liquid handling system and on which liquid containers may be placed, individually and/or in racks, plates or in any other collective form. The liquid containers may for example be liquid containers which hold samples, such as test tubes, but also liquid containers which hold reagents to be used with the samples, e.g., in the form of reagent reservoirs.

The robotic liquid handling system may further comprise at least one robotic arm which may be positionable in the workspace. For example, the robotic arm may have three degrees-of-freedom (DoFs) in the workspace. In a specific example, the robotic arm may be positionable in a plane parallel to the worktable, thereby having two DoFs in this plane, as well as perpendicular to the worktable, thereby having one other DoF. The plane may, for ease of reference, also be referred to as a XY plane when considering points in the physical space above a worktable as being defined in a XYZ coordinate system and with the Z-axis of the coordinate system being aligned with the direction of gravity. It will be appreciated that while the plane may elsewhere be referred to as a XY plane, the actual control and movement of the robotic arm may take place in a different coordinate system, such as a cylindrical coordinate system.

The control and movement of the robotic arm perpendicular to the work area may also be referred to as a control and movement along a Z-axis. Thereby, the robotic arm may move with its end-effector towards and away from the worktable. This may for example allow a robotic arm which has a gripper as end-effector to pick up a sample in the workspace, e.g., by lowering the gripper, gripping the sample container, and then lifting the gripper again. It will be appreciated that, typically, the Z-axis along which the robotic arm may be moved may correspond to the direction of gravity.

In general, such movement in the workspace may allow the robotic arm to handle liquid containers and to interact with samples in those containers, and to move in the XY plane above any objects placed on the surface of the work area.

Surprisingly, the inventors have devised that it is possible to use the robotic arm to open reagent reservoirs. Such reagent reservoirs are liquid containers which are typically filled with a liquid reagent for use in a liquid handling process, and which normally have a topside opening via which the reagent may be extracted, e.g., via pipetting, and which is typically sealed by foil, e.g., to prevent contamination and spilling of the liquid reagent before use. A specific yet nonlimiting example of a reagent reservoir is a rectangular reservoir, which may also be referred to as a reagent 'trough', and which may for example be manufactured out of polypropylene and which may have standardized dimensions of for example 79 mm×16 mm or 78 mm×17.5 mm. Liquid reagent from the reagent reservoir may be consumed during a liquid handling process. As such, the reagent reservoir may be considered as a 'consumable' and/or a 'disposable'. Alternatively, the reagent reservoir may be re-usable after use.

To prevent damage to the foil during transport, and thereby prevent the contamination or spilling of the reagent, the foil is typically applied to the reservoir in such a way that it does not inadvertently open or rupture, for example by using a sufficiently thick foil and sufficiently strong adhesive. Conventionally, such reagent reservoirs may be opened by hand, e.g., by a lab technician, for example by grasping onto a pull-tab extending from the foil, by which the foil may be removed by slowly yet firmly pulling laterally across the opening unit the foil becomes entirely detached.

It may be desirable to enable such reagent reservoirs to be opened automatically, i.e., by the robotic liquid handling system, since this may greatly facilitate the efficiency by which certain liquid handling processes which involve the use of reagent reservoirs may be automated using the robotic liquid handling system.

The inventors have devised that such a reagent reservoir may not be simply opened by having a robotic arm replicate manual opening actions. Namely, such actions may be too intricate to reliably reproduce. In particular, it may be difficult for a robotic arm to reliably grasp a pull-tab, which may not always be easily reachable and in a same position, and to reliably maintain a grip on the pull-tab while pulling the foil off the reservoir. Moreover, if such a pulling force is exerted onto the foil, it may be needed to apply a counterforce to the reagent reservoir. Namely, the reagent reservoir may typically not be affixed to a worktable, but rather removably placed in a rack or the like. Accordingly, any horizontal force exerted onto a reagent reservoir may cause the reagent reservoir to slide or in some cases even tip-over. To prevent this, a two-handed operation may be needed, in that another robotic arm may need to exert a counterforce on the reagent reservoir so as to keep the reagent reservoir in place. Such a second robotic arm may not always be available. In addition, opening a reagent reservoir by pulling a pull-tab may require complex control mechanisms including planning and collision avoidance since it may require the robotic arm to perform horizontal movement around the reagent reservoir, risking collision with other objects on the work surface.

The inventors have therefore devised a different way of opening a reagent reservoir which addresses at least one of these disadvantages. Namely, instead of pulling a pull-tab, the robotic arm may be controlled to open the reagent reservoir using two different tools, namely a cutting tip which is sharp enough to pierce the foil and a blunt protrusion which may be used to push parts of the foil downwards into the reagent reservoir. Here, the term 'blunt' may refer to the protrusion being blunt at least in relation to the cutting tip and generally not intended for cutting a foil. In particular, the robotic arm may be controlled to cut at least two flaps into the foil using the cutting tip. For example, the two flaps may be opposite flaps which share a common cutting line. These two flaps may then be pushed downwards into the reagent reservoir using the blunt protrusion, thereby clearing at least part of the opening of the reagent reservoir.

The opening of the reagent reservoir in the above-stated manner is different from a conventional manual opening of the reagent reservoir and rather tailored to a robotic arm. Namely, by using a sharp cutting tip to create the two flaps in the foil, less horizontal force may be exerted onto the reagent reservoir than when pulling a pull-tab. This means that it may not be needed to hold the reagent reservoir or apply a counterforce thereto with a second robotic arm. In addition, the clearing of the foil by pushing the flaps downwards may involve a downward force for which a counterforce may be naturally provided by the surface or rack or the like on which the reagent reservoir is placed. Furthermore, the opening of the reagent reservoir in the above-stated manner may be independent of the shape, position and/or orientation of a pull-tab, and may therefore represent a type of opening which may be easier to automate and in fact may not even require the presence of a pull-tab. Moreover, the downwards pushing of the flaps may still sufficiently clear the opening of the reagent reservoir, thereby avoiding the need to entirely remove the foil from the reagent reservoir.

In an advantageous embodiment, the cutting tip and the blunt protrusion may be provided on two opposite ends of a single tool. The single tool may for example be gripped by the robotic arm and then, by suitably positioning either the cutting tip or the blunt protrusion relative to the reagent reservoir, either be used to cut the flaps into the foil or to push the flaps downward into the opening of the reagent reservoir. Such a single tool may simplify the automation workflow, in that it may not be needed to switch tools while opening the reagent reservoir, which may otherwise require additional time.

It may be conceived to open a reagent reservoir by simply perforating the foil with a robotic arm's head, for example using a mounted disposable tip which may then also be used to interact with the reagent liquid. Disadvantageously, a perforation using such relatively blunt tools may cause the pressure on the foil to gradually increase until the foil abruptly tears, which may cause the liquid in the reagent reservoir to spatter about. The inventors have furthermore devised that such opening by perforation may be difficult to control, meaning that the established opening may itself not have a consistent position and/or size relative to the initial position of the disposable tip. Additionally, or alternatively, the outline of the established opening may be frayed due to the unpredictable tearing of the foil. This in turn may mean that if the disposable tip is inserted through the established opening into the reagent reservoir, e.g., to extract reagent, that the unpredictable shape of the established opening may cause the disposable tip to be horizontally deflected upon entry or exit, or the reagent reservoir to be pulled upwards along with the disposable tip if the disposable tip gets stuck in the established opening. Another drawback of such type of opening of the foil sealing the reagent reservoir is that if the liquid level is measured using a capacitive measurement using the disposable tip, this measurement may be disturbed if the disposable tip accidentally touches the frayed border of a metallic sealing foil.

Advantageously, the above measures may allow additional types of actions in liquid handling tasks to be automated, which previously may have required manual intervention or which previously had to be entirely avoided in liquid handling tasks. This may be highly advantageous in high-throughput applications in which many samples may need to be processed using the robotic liquid handling system. In addition, while it is known for robotic liquid handling systems to use reagents in liquid handling task, such use was previously limited to either sealed reagents which were manually opened, or bulk reagents which were poured from flasks into reservoirs. The ability to automatically open and use sealed reagents may save time, reduce errors (spilling) and avoid misplacement since sealed reagents are typically barcoded (type of reagent, lot number, expiry date). Another advantage of being able to use sealed reagents may be that in open reservoirs, part of the reagent solution may evaporate, for example if too much time has elapsed after the reagent is poured into the reservoir, which may increase the concentration of the reagent and thereby affect assay results.

In some embodiments, the controller may be configured to control the robotic arm to cut a H-shaped or X-shaped pattern in the foil to establish the at least two flaps. An H- or X-shaped pattern may be an efficient way to cut at least two flaps into the foil since it may require relatively few cuts. In addition, the flaps in such H- or X-patterns may have their free-hanging ends adjacent to each other, which means that multiple flaps may be pushed jointly downwards into the reagent reservoir using the blunt protrusion. This may reduce the number or length of actions to be performed by the robotic arm to open the foil, which in turn may lead to an increased throughput. In addition, the flaps may remain affixed to the foil at or near the sidewall of the reagent reservoir, which means that the flaps, when pushed downwards into the reagent reservoir, do not or not significantly block the opening of the reagent reservoir.

In some embodiments, the controller may be configured to control the robotic arm to cut the H-shaped or X-shaped pattern in the foil by controlling the robotic arm to:
  cut a central slit across the foil, and
  cut from the central slit in both directions perpendicularly or diagonally away from the central slit towards a periphery of the opening to establish at least one flap at each side of the central slit.

The above sequence of actions may be an advantageous way for the robotic arm to cut a H-shaped or X-shaped pattern in the foil to establish the flaps. In an alternative embodiment, the robotic arm may be controlled to first cut the perpendicular or diagonal slits towards the periphery of the opening, and only afterwards the central slit across the foil joining the peripheral slits. This embodiment may be advantageous when there is substantial variability in the foil's appearance, e.g., taut and even in some cases, and dented or with depressions in other cases.

In some embodiments, the opening is a rectangular opening having a width and a length, and wherein the controller is configured to control the robotic arm to:
  cut the central slit centrally along the length of the opening;
  cut from each respective end of the slit in both directions towards a corner of the opening.

In case the opening is a rectangular opening, the robotic arm may cut the central slit along the length of the opening, referring to a longest dimension of the opening. This may result in flaps being created which may be relatively wide but short, in that they may only extend, at the maximum, across half the width of the opening. Such short flaps may not need to be pushed down as far as longer flaps to clear the opening, so that the opening of the reagent reservoir may be easier cleared for access. In general, a cutting pattern may be selected so that flaps are cut into the seal which, when sloping downward into the opening due to gravity or by being pushed into the opening, have a size and shape which avoids contact with the reagent in the reservoir, thus minimizing potential contamination. In addition, in general, the robotic arm may be controlled such that it is avoided for the cutting tip and the blunt protrusion to come into contact with the reagent, thus minimizing potential contamination and spillage.

In some embodiments, the blunt protrusion has a width which spans at least 75% of the width of the opening, and wherein the controller may be configured to control the robotic arm to push the two flaps downwards with the blunt protrusion oriented so that the width of the blunt protrusion is parallelly aligned with the width of the opening. By using a blunt protrusion which has a width which spans a significant part of the width of the reagent reservoir, the flaps which may be created at opposite sides of the central slit may be jointly pushed downwards by a downward pushing action with the blunt protrusion by the robotic arm, rather than the robotic arm having to individually push down each of the flaps at each opposite side. This may reduce the number of pushing actions to be performed by the robotic arm to open the foil. In addition, it may not be needed to exert sideways forces on the reservoir to clear the reservoir's opening, which otherwise may require additional fixation of the reservoir.

In some embodiments, the controller may be configured to, as part of clearing the opening of the reagent reservoir, control the robotic arm to individually push the blunt protrusion downwards at a number of positions along the central slit.

The robotic arm may push downwards with the blunt protrusion at a number of positions along the central slit, which may also enable reagent reservoirs which have a rather elongated opening to be sufficiently cleared from the foil. Namely, in case of a rather elongated opening, a single downwards push along the length of the opening may cause the flaps to be insufficiently pushed downwards into the reagent reservoir.

In some embodiments, the controller is configured to, after individually pushing the blunt protrusion downwards at the number of positions along the central slit, control the robotic arm to:

insert the blunt protrusion into the opening past a height of the foil; and
move the blunt protrusion along the length of the central slit.

By, after having pushed down the flaps, inserting the blunt protrusion into the opening past the original height of the foil (while normally keeping the blunt protrusion above the liquid level), and by subsequently moving the blunt protrusion laterally along the length of the slit, the flaps may be pressed more towards the sidewalls of the reagent reservoir to as to more fully clear the opening from the foil.

In some embodiments, the controller may be configured to cut the at least two flaps in the foil by controlling the robotic arm to:

with the cutting tip, pierce the foil at an entry position; and
from the entry position, move the cutting tip laterally with the cutting tip inserted into the opening at a first depth past a height of the foil.

The flaps may be cut into the foil by lateral movement of the cutting tip after it has pierced the foil. In particular, the cutting tip may be sharp enough to cut the foil in any direction. Compared to a knife or similar directional tool, this may simplify the cutting actions since it may not be needed to reorient the tool in accordance with the direction of cutting. Rather, the tool may be held by the robotic arm and then simply be moved laterally in any desired manner to cut the at least two flaps into the foil.

In some embodiments, the controller may be configured to control the robotic arm to, after moving the cutting tip laterally along a cutting path at the first depth, move the cutting tip laterally along at least part of the cutting path with the cutting tip inserted into the opening at a second depth past the height of the foil, wherein the second depth exceeds the first depth.

If the foil is relatively resilient, as a precaution to ensure that the foil has been cut sufficiently along the cutting path, the cutting tip may be moved repeatedly along at least part of the cutting path, for example once at a first entry depth and a second time at a second depth which exceeds the first depth. This may ensure that the flaps indeed have been cut into the foil before attempting to push the flaps downwards.

In some embodiments, the reagent reservoir may be a rectangularly-shaped reagent trough. For example, the reagent trough standardized dimensions of for example 79 mm (length)×16 (width) mm or 78 mm (length)×17.5 mm (width).

In some embodiments, the controller may be configured to control the robotic arm to:

pick-up an opening tool, wherein the opening tool comprises the cutting tip and the blunt protrusion;
use the cutting tip of the opening tool to create the at least two flaps in the foil; and
use the blunt protrusion of the opening tool to clear at least part of the opening of the reagent reservoir.

The cutting tip and the blunt protrusion may be provided on two opposite ends of a single opening tool. The single tool may for example be gripped by the robotic arm and then, by suitably positioning either the cutting tip or the blunt protrusion relative to the reagent reservoir, either be used to cut the flaps into the foil or to push the flaps downward into the opening of the reagent reservoir. Such a single tool may simplify the automation workflow, in that it may not be needed to switch tools while opening the reagent reservoir, which may otherwise require additional time.

In some embodiments, the opening tool may have two opposing surfaces by which the opening tool can be gripped and picked-up, wherein the robotic arm may be arranged to mount a pair of grippers to pick-and-place objects in a workspace of the robotic liquid handling system, and wherein the controller may be configured to control the robotic arm to pick-up the opening tool by gripping the opening tool with the pair of grippers at the two opposing surfaces. The opening tool may have a shape which may allow it to be gripped by a robotic arm which is equipped with a pair of grippers. For that purpose, the two opposing surfaces by which the opening tool may be gripped may be spaced apart so to match the physical span of the grippers, both in an open position the grippers as well as in a closed 'gripping' position of the grippers. In addition, the opposing surfaces may be large enough for the grippers to engage with the surfaces.

In accordance with a further aspect of the invention, a kit-of-parts may be provided comprising the robotic liquid handling system and the opening tool.

In some embodiments of the opening tool, the elongated main body comprises at each respective end of the elongated shape a respective recess, wherein said recesses provide the opposing surfaces to be gripped.

In some embodiments of the opening tool, the cutting tip has pyramidal shape having an apex projecting away from the elongated surface. Such a type of cutting tip may be multidirectional, in that it may allow the foil to be cut in different directions, or even omnidirectional, which may allow cutting independent of the orientation of the cutting tip about its longitudinal axis relative to the cutting direction.

In some embodiments of the opening tool, the cutting tip is made of a glass fiber reinforced thermoplastic, such as glass fiber reinforced Polyetheretherketone (PEEK).

In some embodiments of the opening tool, the opening tool may have exterior dimensions which are substantially equal to the reagent reservoir. This may allow the robotic arm, which may be configured to pick-and-place reagent reservoirs, to also pick-up and operate the opening tool with a same type of end-effector, e.g., with the same type of grippers. This may avoid having to change the end-effector between picking-and-placing reagent reservoirs and the opening the foil of reagent reservoirs.

It will be appreciated by those skilled in the art that two or more of the above-mentioned embodiments, implementations, and/or aspects of the invention may be combined in any way deemed useful.

Modifications and variations of any one of: the robotic liquid handling system, the opening tool, the method and/or computer program, which correspond to the described modifications and variations of another one of these entities, may be carried out by a person skilled in the art on the basis of the present description.

BRIEF DESCRIPTIONS OF DRAWINGS

These and other aspects of the invention are apparent from and will be elucidated with reference to the embodiments described hereinafter. In the drawings, FIG. 1 shows a schematic overview of a robotic liquid handling system which is configured to establish an opening in a foil of a reagent reservoir;

FIGS. 3A-3C show an opening tool which comprises at one end a sharp cutting tip for piercing and cutting the foil sealing the reagent reservoir and at another end a blunt protrusion for pushing flaps cut into the foil downwards into the opening of the reagent reservoir, with:

Figure 3A:
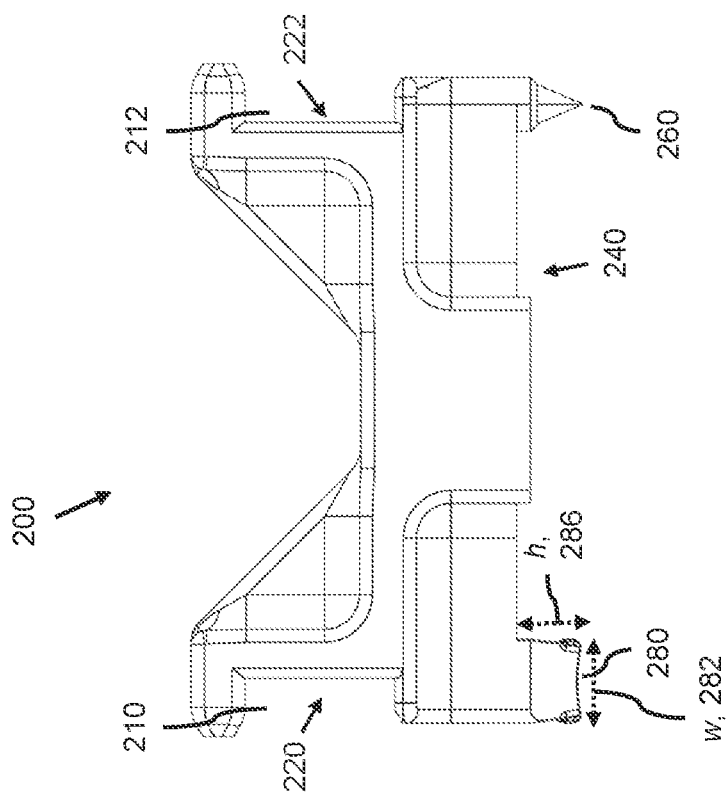
Figure 3C:
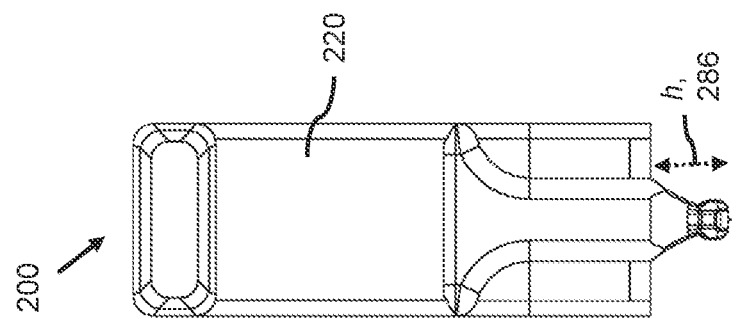
Figure 3B:
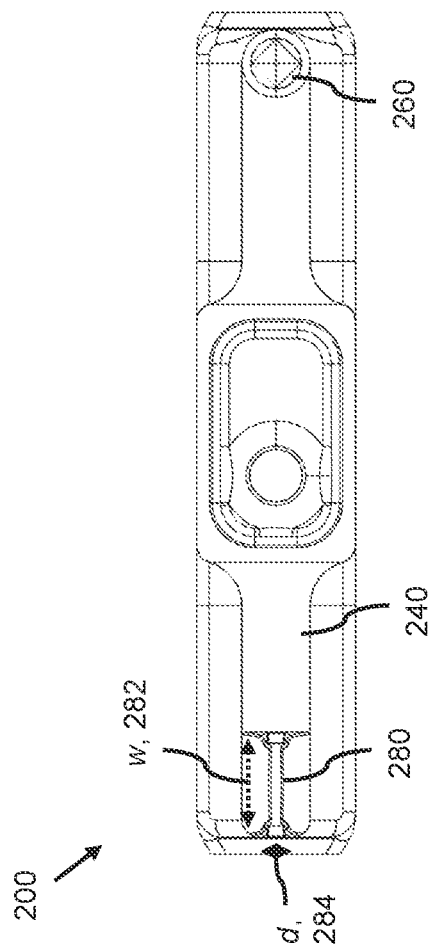
Figure 5:
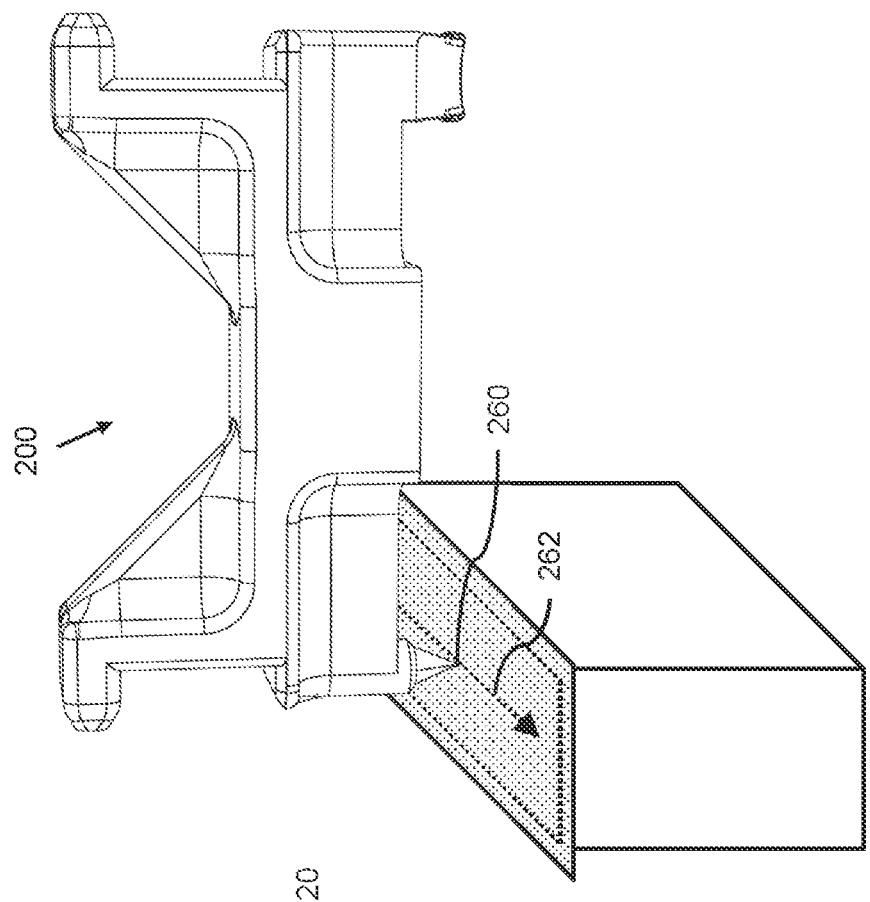
Figure 4:
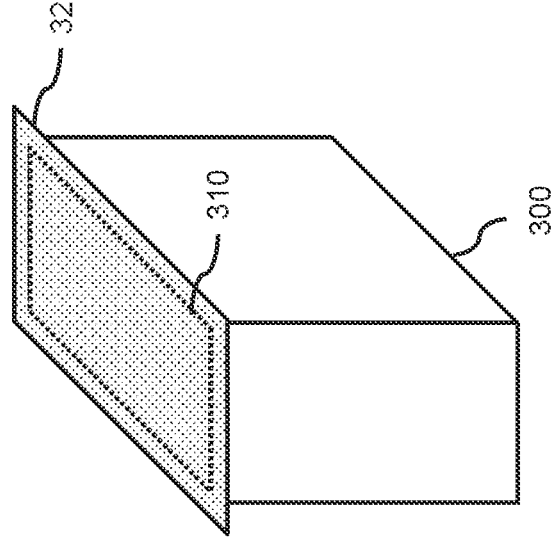

FIG. 3A showing a front view of the opening tool,
FIG. 3B showing a bottom view of the opening tool, and
FIG. 3C showing a side view of the opening tool;
FIG. 4 shows a reagent reservoir which is sealed by a foil;
FIG. 5 shows the opening tool being used to cut the foil which seals the reagent reservoir, namely by cutting a central slit across a length of the foil;

FIGS. 6A-6D illustrate a H-shaped pattern being cut into the foil using the opening tool so as to establish two flaps in the foil;

FIG. 7 shows the opening tool being used to push the two flaps downwards into the reagent reservoir at a number of positions along a length of the opening;

FIGS. 8A-8D illustrate a clearing of the opening of the reagent reservoir by using the blunt protrusion to push the flaps downwards and then moving the blunt protrusion tool along the length of the opening while partially inserted into the opening;

FIGS. 9A-9D show different examples of H- and X-shaped cutting patterns.

It should be noted that items which have the same reference numbers in different Figures, have the same structural features and the same functions, or are the same signals. Where the function and/or structure of such an item has been explained, there is no necessity for repeated explanation thereof in the detailed description.

REFERENCE SIGNS LIST

The following list of references signs is provided for facilitating the interpretation of the drawings and shall not be construed as limiting the claims.

100 robotic liquid handling system
110 robotic liquid handling instrument
120 worktable
140, 142 robotic arm
150 disposable tip mounted to liquid-handling head
160 gripper module
162 grippers
180 controller
200 opening tool
210, 212 recess
220, 222 surface
240 elongated downward-facing surface
260 cutting tip
262 cutting movement
280 blunt protrusion
282 width w of blunt protrusion
284 depth d of blunt protrusion
286 height h of blunt protrusion
290 downward push
292 clearing movement
300 reagent reservoir
310 opening
320 foil
340 flaps
400 central slit
402 central slit after cutting at increased depth
410 peripheral slits
500 h-shaped cut pattern
510 hybrid between H-shaped and X-shaped cut pattern
520 x-shaped cut pattern
530 alternative h-shaped cut pattern
540 h-shaped cut pattern with additional cross-sectional cut

DETAILED DESCRIPTION OF EMBODIMENTS

The following embodiments relate to a robotic liquid handling system for performing liquid handling tasks in a laboratory environment. The robotic liquid handling system may in general comprise a robotic arm which may be configured to, using a cutting tip, cut at least two flaps in the foil of a reagent reservoir, and using a blunt protrusion, push the at least two flaps downwards into the reagent reservoir to partially clear the opening of the reagent reservoir. In some embodiments, the cutting tip and blunt protrusion may be part of a same tool which may be gripped by the robotic arm, for example using a pair of grippers which are mounted by the robotic arm.

FIG. 1 shows a robotic liquid handling system 100 which may comprise a robotic liquid handling instrument 110 and a controller 180. FIG. 1 shows the robotic liquid handling instrument 110, and thereby the robotic liquid handling system 100, to comprise a work area 120 for holding objects such as liquid samples, racks, etc. An example of a work area is a worktable. In the example of FIG. 1, the robotic liquid handling instrument 110, and thereby the robotic liquid handling system 100, is further shown to comprise two robotic arms 140, 142, but may also have one robotic arm or more than two robotic arms. In the example of FIG. 1, each robotic arm 140, 142 may be controllable to be positioned in a XY plane parallel to the work area and along a Z-axis perpendicular to the work area. For that purpose, the robotic liquid handling system 100 may comprise the controller 180, which may be configured to control the robotic arms 140, 142 to position and operate a respective robotic arm as part of a liquid handling task. As will be elucidated elsewhere in this specification, the controller 180 may be physically integrated into the robotic liquid handling instrument 110 but may also be an external controller (as shown in FIG. 1), such as a PC or workstation.

Figure 2:
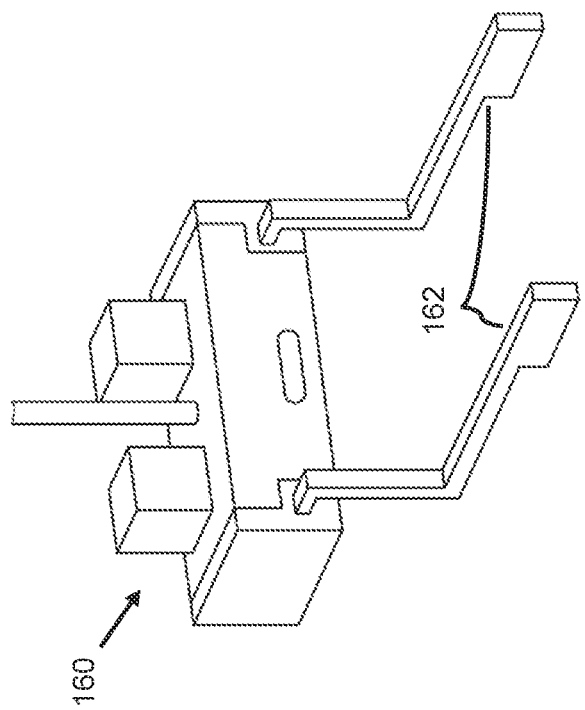
FIG. 2 shows a gripper module which comprises a pair of grippers, with the gripper module being mountable by the robotic arm to enable the robotic arm to pick-up an opening tool with which the foil of the reagent reservoir may be opened.

FIG. 1 further shows the robotic arms 140, 142 of the robotic liquid handling instrument 110 to comprise different attachments, with one of the robotic arms 142 comprising a liquid handling head having a pipette with a connecting piece (not separately shown) to which a disposable tip 150 is mounted. The other robotic arm 140 is shown to comprise a robotic head in the form of a gripper module to which a pair of grippers 162 is mounted. FIG. 2 shows the latter type of a robotic head in more detail. In particular, FIG. 2 shows the gripper module 160 to comprise a pair of grippers 162, with the gripper module 160 being mountable to the robotic arm so as to enable the robotic arm to pick-and-place objects on the worktable 120. For example, the robotic liquid handling system may use the pair of grippers 162 to pickand-place sample containers, such as tubes, or reagent reservoirs. For that purpose, the pair of grippers 162 may be moved laterally towards each other in a 'picking-up' or 'gripping'-type of action, and away from each other in a 'releasing'-type of action. In some embodiments of the robotic liquid handling system, the pair of grippers 162 may also be used to pick-up an opening tool with which tool the foil of a reagent reservoir may be opened.

FIGS. 3A-3C show an example of such an opening tool 200, which may be used to open a reagent reservoir which has an opening which is sealed by a foil. FIG. 3A shows a front view of the opening tool, FIG. 3B shows a bottom view of the opening tool and FIG. 3C shows a side view of the opening tool. Here, the term 'bottom' may refer to the bottom surface 240 of the opening tool 200, as also shown in FIG. 3B, which faces downward towards the worktable during intended use of the opening tool 200.

As can be seen in FIGS. 3A-3C, the exemplary opening tool 200 has a main body with an elongated shape, the elongated shape having at each respective end of the elongated shape a recess 210, 212 so as to provide the opening tool 200 with two opposing and recessed surfaces 220, 222 at which the opening tool 200 can be laterally gripped and picked-up, for example by the aforementioned pair of grippers 162 of FIGS. 1 and 2. The opening tool 200 is further shown to comprise an elongated downward-facing surface 240 which runs along a length of the main body. The elongated surface 240 comprises, at one end, a cutting tip 260 for piercing and cutting the foil of the reagent reservoir, and at an opposing end, a blunt protrusion 280 for pushing flaps cut into the foil downwards into the opening of the reagent reservoir.

The blunt protrusion may be blunt in relation to the cutting tip, and in general designed not to cut into a foil. For example, the blunt protrusion may have at its most distal part a width w 282 which covers at least 50%, or in some cases 75% of a width of the reagent reservoir. In a specific example, in case of a rectangular reagent reservoir having an opening of 79 mm×16 mm, the blunt protrusion may have a width of at least 8 mm, or in some embodiments 12 mm. In another specific example, in case of a rectangular reagent reservoir having an opening of 78 mm×17.5 mm, the blunt protrusion may have a width of at least 8.75 mm, or in some embodiments 13.125 mm. Here, the 'width' w (reference numeral 282 in FIGS. 3A-3C) may refer to a dimension of the blunt protrusion along the elongated main body of the opening tool 200, with the 'height' h (286) referring to dimension of the blunt protrusion which is perpendicular to the width w in the plane of FIG. 3A, and with the 'depth' d (284) referring to a dimension of the blunt protrusion which is perpendicularly extends from/into the plane in FIG. 3A.

The blunt protrusion 280 may have various shapes, such as a substantially cuboid, cylindrical, ellipsoid or (hemi) spherical shape. In other examples, the blunt protrusion 280 may be prism- or wedge-shaped. In general, the blunt protrusion 280 may have a tapered shape, which may be tapered along one dimension. In the specific example of FIGS. 3A-3C, the blunt protrusion 280 is shown to be tapered in depth d 284, resulting in the most distal part of the broad protrusion having a relatively small depth d 284 in relation to the width w 282, for example 3-5 mm compared to 8-12 mm.

With continued reference to the cutting tip 260, the cutting tip 260 may be suitable for cutting by having a pyramidal or cone-like shape having a single sharp apex and by being made of a sufficiently hard material in relation to the material of the foil. In a specific example, the cutting tip 260 may be made out of a glass fiber reinforced thermoplastic, such as glass fiber reinforced Polyetheretherketone (PEEK).

In another specific example, the opening tool 200 may be manufactured using additive manufacturing, for example using selective laser sintering (SLS), and may comprise or consist of a polyamide powder filled with glass particles. In such an example, the cutting tip may be manufactured using a plastic injection mold and may be made of the material PEEK GF30 which is a type of glass fiber reinforced PEEK.

FIG. 4 shows a reagent reservoir 300 having an opening 310 which is sealed by a foil 320 and which may be opened by the robotic liquid handling system as described in this specification. The reagent reservoir 300 may also be referred to as a reagent 'trough', and may for example be manufactured out of polypropylene and may have standardized dimensions. Non-limiting examples of such dimensions include 79 mm×16 mm and 78 mm×17.5 mm and 50 mm×74 mm and 77 mm×113 mm. Liquid reagent from the reagent reservoir may be consumed during a liquid handling process. As such, the reagent reservoir may be considered as a 'consumable' and/or a 'disposable'. Alternatively, the reagent reservoir may be re-usable after use.

With continued reference to FIG. 1, the robotic liquid handling system 100 may be configured to, as part of a liquid handling task, control the robotic arm 140 to open the reagent reservoir 300, namely by the controller 180 controlling the robotic arm 140 to open the foil 320 by controlling the robotic arm to, using a cutting tip, cut at least two flaps in the foil, and using a blunt protrusion, push the at least two flaps downwards into the reagent reservoir to clear at least part of the opening of the reagent reservoir.

For that purpose, the robotic liquid handling system 100 may pick-up, or in any other way hold, the opening tool 200 of FIGS. 3A-3C. The following examples illustrate such opening by the opening tool 200 being gripped by the pair of grippers 162 of FIG. 2. However, this is not a limitation, in that the robotic liquid handling system 100 may also use a different cutting tip and blunt protrusion, for example arranged on different tools to be picked up one-after-each-other or held simultaneously, or with the cutting tip and blunt protrusion being provided directly on a robotic head which may be mounted by the robotic arm 140. As such, the use of the opening tool 200 and the picking-up of the opening tool 200 with the pair of grippers 162 is merely exemplary.

FIG. 5 shows the opening tool 200 being used to cut the foil which seals the reagent reservoir, namely by the cutting tip 260 of the opening tool 200 being used to cut a central slit 262 across a length of the foil. It is noted that to avoid unnecessary clutter, the robotic arm and the pair of grippers themselves are not shown in FIG. 5 (and later FIG. 7). It is further noted that the depicted operations of the opening tool 200 may be the result of the controller of the robotic liquid handling system being programmed to carry out these operations. In particular, FIG. 5 may show an intermediate result of the controller being configured to control the robotic arm to pierce the foil at an entry position, and from the entry position, move 262 the cutting tip laterally while inserted into the opening past a height of the foil. For example, the foil may be pierced by having the cutting tip 260 rapidly move downwards a number of millimeters, e.g., 1.5 mm or 2 mm or 3 mm, below the plane of the foil, thereby piercing the foil, while the cutting may be performed with the cutting tip inserted at the same depth, or at a more shallow depth, past a height of the foil. In a specific example, the foil may be pierced by carrying out a rapid piercing motion to 3 mm below the height of the foil, while then cutting the foil with the cutting tip inserted at 1.5 mm below the height of the foil.

The cutting of a central slit 262 may be a first step in cutting a H- or X-shaped pattern in the foil, and thereby establishing at least two flaps in the foil.

Figure 6D:
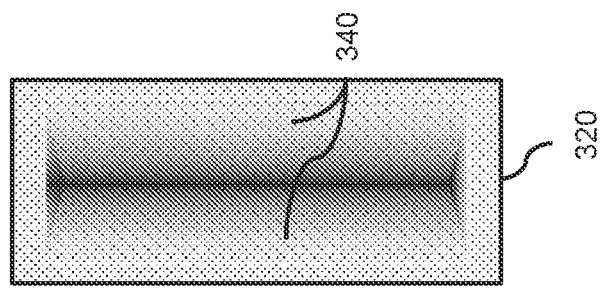
Figure 6C:
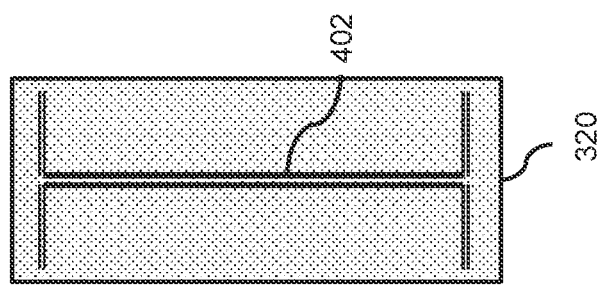
Figure 6B:
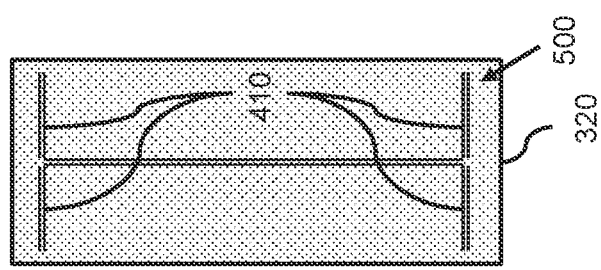
Figure 6A:
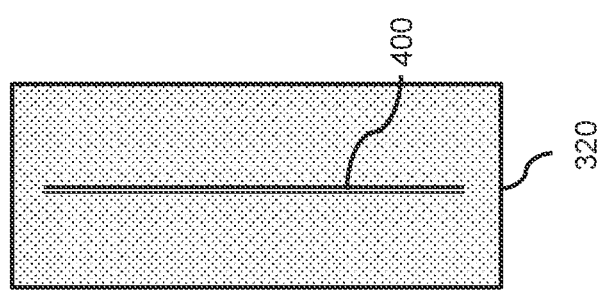

FIGS. 6A-6D illustrate such a H-shaped pattern being cut into the foil 320 using the opening tool. Namely, as a first step of which the result is shown in FIG. 6A, the foil 320 may be pierced and a central slit 400 may be cut across the foil, e.g., along the length direction of the opening of the reagent reservoir. In a second step, the robotic arm may use the cutting tip to cut at each end of the central slit in both directions perpendicularly (or in case of an X-shaped pattern, diagonally) away from the central slit towards a corner of the opening, thereby establishing four peripheral slits 410 which together with the central slit form the H-shaped cut pattern 500. In some embodiments, the central slit may then be recut at a larger insertion depth, for example at 3 mm below a height of the foil instead of an original cutting depth of 1.5 mm. This is illustrated in FIG. 6C which shows the central slit 402 after cutting at increased depth.

As also shown in FIG. 6D, the cutting of the H-shaped pattern 500 in the foil may result in two flaps 340 being established in the foil, which may due to gravitational force partially tilt downwards into the opening of the reagent reservoir. However, the opening of the reagent reservoir may still be insufficiently cleared from the foil as the flaps may still cover a significant part of the opening. As such, as also shown in FIG. 7, the robotic arm may be controlled to push the two flaps downwards into the reagent reservoir using a blunt protrusion 280, e.g., of the opening tool 200 of FIGS. 3A-3C. For that purpose, the robotic arm may suitably position the blunt protrusion above the reagent reservoir 300, for example by rotating the opening tool 200. The flaps may then be pushed downwards by at least one, and in some examples, a number of downward pushes 290 of the blunt protrusion 280 into the opening of the reagent reservoir 300. Such pushes may for example involve the blunt protrusion 280 moving past a height of the foil but keeping clear of the liquid reagent contained in the reagent reservoir.

In an alternative to the sequence of actions depicted in FIGS. 6A-6D, the robotic arm may also be controlled to first cut the perpendicular or diagonal slits towards the periphery of the opening, e.g., as illustrated in FIG. 6B per se, and only afterwards cut the central slit across the foil joining the peripheral slits, e.g., as illustrated in FIGS. 6A and 6C per se. In other words, the sequence of actions may be switched.

In some examples, to further clear the opening of the reagent reservoir 300 from the foil, the controller may be configured to control the robotic arm to push the flaps cut into the foil downwards into the reagent reservoir 300 at a number of positions along a length of the opening, as also illustrated in FIG. 7 showing such different positions by different arrows 290 representing a downward push at each of these positions. For example, the blunt protrusion 280 may push the flaps downwards at positions which are spaced apart by a constant interval, say every 9 mm, or by a varying interval, e.g., more densely near the side walls of the reagent reservoir. As also shown in FIG. 7, the controller may in general be configured to control the robotic arm to push the two flaps downwards with the blunt protrusion oriented so that the width of the blunt protrusion is parallelly aligned with the width of the reservoir's opening.

Figure 8D:
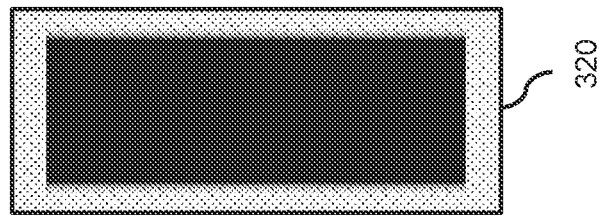
Figure 8C:
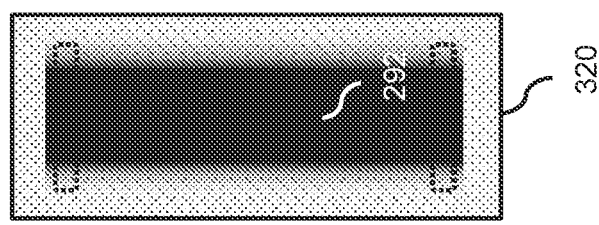
Figure 8B:
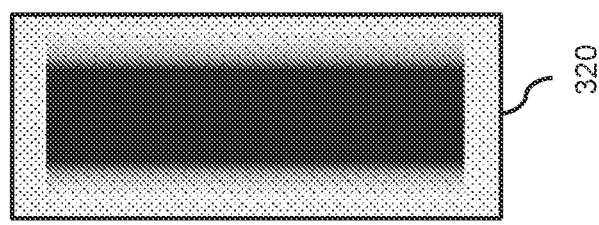
Figure 8A:
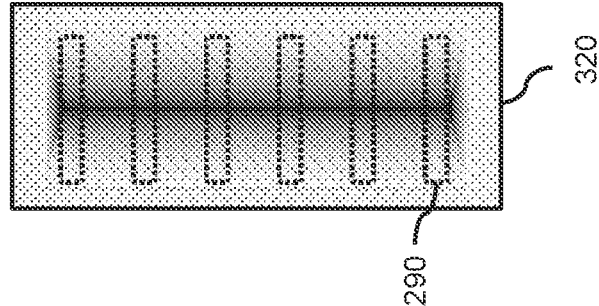

FIGS. 8A-8D further illustrate a clearing of the opening of the reagent reservoir by the blunt protrusion being used to push flaps downwards into the opening and subsequently moving the blunt protrusion along the length of the opening while keeping the blunt protrusion partially inserted into the opening past a height of the foil. Namely, as shown in FIG. 8A, the robotic arm may use the blunt protrusion to individually push the flaps downwards at a number of positions 290 along the central slit, with each position being visually represented in FIG. 8A by a dashed outline of the blunt protrusion at a respective position. As shown in FIG. 8B, this may result in the flaps being pushed downwards into the opening of the reagent reservoir and thereby largely clearing the opening of the reagent reservoir from the foil 320. To even further clear the opening, the blunt protrusion may then again be inserted into the opening past a height of the foil and moved 292 along the length of the opening. This may further push the flaps against the sidewalls of the reagent reservoir, and thereby further clear the opening of the reagent reservoir, as also visually illustrated in FIG. 8D.

Figure 9D:
Figure 9C:
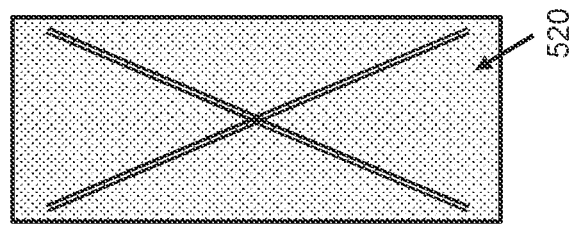
Figure 9B:
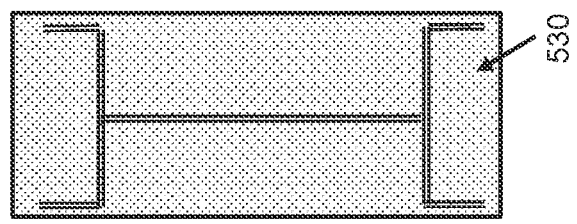
Figure 9A:
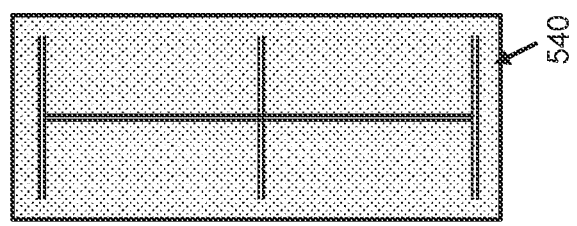

It will be appreciated that various cutting patterns may be used to establish at least two flaps in the foil. For example, a cutting pattern may result in more than two flaps being cut into the foil, which may be cleared by downward pushes of the blunt protrusion in a similar manner as described with reference to FIGS. 7-8D. For example, FIG. 9A shows a hybrid pattern 510 between a H- and X-shaped cutting pattern, which establishes two larger flaps and two smaller flaps in the foil, while FIG. 9B shows a X-shaped pattern 520 which establishes four similar sized flaps in the foil. As another example, FIG. 9C shows an alternative H-shaped pattern 530 in which two additional rectangular flaps are created at the respective ends of the opening, while FIG. 9D shows an H-shaped pattern 540 having a transverse cut at or near the middle of the central slit, thereby establishing four similar sized rectangular flaps in the foil.

In general, the controller may be configured, e.g., by hardware design or software, to perform the operations described in this specification in as far as pertaining to the control of the robotic arm. The controller may be embodied by an external computer, e.g., a PC or laptop or workstation, which may be connected via a communication interface, such as an USB interface or any other serial or parallel interface or a local network interface or personal network interface, to the robotic liquid handling instrument to which the robotic arm(s) are attached. Here, the adjective 'external' may refer to the controller not being part of the robotic liquid handling instrument. In some other embodiments, the controller may be embodied by an embedded computer which may be part of the robotic liquid handling instrument.

In general, the controller may comprise one or more (micro)processors which execute appropriate software, such as one or more x86 or ARM-based processors (CPUs), but also by a combination or system of such processors and/or other types of processing units. Software implementing the functionality of the controller may have been stored in a corresponding memory or memories, e.g., in volatile memory such as RAM or in non-volatile memory such as Flash. Alternatively, the functionality of the controller may be implemented in the form of programmable logic, e.g., as a Field-Programmable Gate Array (FPGA). In general, the controller may be implemented as one or a combination of circuits. In general, the controller may be implemented in a distributed manner, e.g., distributed over different servers or distributed according to a client-server model. The controller may also be implemented remotely, e.g., by control software running on one or more cloud-based servers.

It is noted that any of the computer-implemented methods described in this specification, for example in any of the claims, may be implemented as software, as dedicated hardware, or as a combination of both. Instructions for the computer, e.g., executable code, may be stored on a computer readable medium, e.g., in the form of a series of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, etc.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A robotic liquid handling system, comprising:
    at least one robotic arm;
    a controller configured to control the robotic arm to position and operate the robotic arm in a workspace of the robotic liquid handling system; wherein
    the controller is configured to, as part of a liquid handling task, control the robotic arm to open a reagent reservoir, wherein the reagent reservoir has an opening which is sealed by a foil, wherein the controller is configured to control the robotic arm to open the foil by controlling the robotic arm to:
        (i) using a cutting tip, cut at least two flaps in the foil; and
        (ii) using a blunt protrusion, push the at least two flaps downwards into the reagent reservoir to clear at least part of the opening of the reagent reservoir, wherein
    the controller is configured to cut the at least two flaps in the foil by controlling the robotic arm to:
        with the cutting tip, pierce the foil at an entry position; and
        from the entry position, move the cutting tip laterally with the cutting tip inserted into the opening at a first depth past a height of the foil.

2. The robotic liquid handling system according to claim 1, wherein the controller is configured to control the robotic arm to cut a H-shaped or X-shaped pattern in the foil to establish the at least two flaps.

3. The robotic liquid handling system according to claim 2, wherein the controller is configured to control the robotic arm to cut the H-shaped or X-shaped pattern in the foil by controlling the robotic arm to:
    cut a central slit across the foil, and cut from the central slit in both directions perpendicularly or diagonally away from the central slit towards a periphery of the opening to establish at least one flap at each side of the central slit.

4. The robotic liquid handling system according to claim 3, wherein the opening is a rectangular opening having a width and a length, and wherein the controller is configured to control the robotic arm to:
    cut the central slit centrally along the length of the opening; and
    cut from each respective end of the slit in both directions towards a corner of the opening.

5. The robotic liquid handling system according to claim 4, wherein the blunt protrusion has as a width which spans at least 75% of the width of the opening, and wherein the controller is configured to control the robotic arm to push the two flaps downwards with the blunt protrusion oriented so that the width of the blunt protrusion is parallelly aligned with the width of the opening.

6. The robotic liquid handling system according to claim 3, wherein the controller is configured to, as part of clearing the opening of the reagent reservoir, control the robotic arm to individually push the blunt protrusion downwards at a number of positions along the central slit.

7. The robotic liquid handling system according to claim 6, wherein the controller is configured to, after individually pushing the blunt protrusion downwards at the number of positions along the central slit, control the robotic arm to:
    insert the blunt protrusion into the opening past a height of the foil; and
    move the blunt protrusion along the length of the central slit.

8. The robotic liquid handling system according to claim 1, wherein the controller is configured to control the robotic arm to, after moving the cutting tip laterally along a cutting path at the first depth, move the cutting tip laterally along at least part of the cutting path with the cutting tip inserted into the opening at a second depth past the height of the foil, wherein the second depth exceeds the first depth.

9. The robotic liquid handling system according to claim 1, wherein the reagent reservoir is a rectangularly-shaped reagent trough.

10. The robotic liquid handling system according to claim 1, wherein the controller is configured to control the robotic arm to:
    pick-up an opening tool, wherein the opening tool comprises the cutting tip and the blunt protrusion;
    use the cutting tip of the opening tool to create the at least two flaps in the foil; and
    use the blunt protrusion of the opening tool to clear at least part of the opening of the reagent reservoir.

11. The robotic liquid handling system according to claim 10, wherein
    the opening tool has two opposing surfaces by which the opening tool can be gripped and picked-up, wherein
    the robotic arm is arranged to mount a pair of grippers to pick-and-place objects in a workspace of the robotic liquid handling system, and wherein
    the controller is configured to control the robotic arm to pick-up the opening tool by gripping the opening tool with the pair of grippers at the two opposing surfaces.

12. A kit-of-parts comprising the robotic liquid handling system and the opening tool according to claim 10.

13. The kit-of-parts according to claim 12, wherein the opening tool comprises:
    a main body with an elongated shape, the elongated shape having at each respective end of the elongated shape a surface to provide two opposing surfaces at which the opening tool can be laterally gripped and picked-up;

an elongated surface which runs along a length of the main body, wherein the elongated surface comprises:
(i) at one end of the elongated surface, the cutting tip for piercing and cutting the foil of the reagent reservoir; and
(ii) at an opposing end of the elongated surface, the blunt protrusion for pushing flaps cut into the foil downwards into the opening of the reagent reservoir, wherein the blunt protrusion is blunt in relation to the cutting tip.

14. The kit-of-parts according to claim 13, wherein the elongated main body comprises at each respective end of the elongated shape a respective recess, wherein each respective recess provides the opposing surfaces to be gripped.

15. The kit-of-parts according to claim 13, wherein the cutting tip has pyramidal shape having an apex projecting away from the elongated surface.

16. The kit-of-parts according to claim 13, wherein the cutting tip is made of a glass fiber reinforced thermoplastic.

17. The kit-of-parts according to claim 16, wherein the cutting tip is made from a glass fiber reinforced polyetheretherketone (PEEK).

18. A computer-implemented method for controlling the robotic liquid handling system according to claim 1, wherein the method comprises controlling the robotic arm to open a foil sealing an opening of a reagent reservoir by the steps of:
(a) using a cutting tip, cut at least two flaps in the foil by piercing the foil with the cutting tip at an entry position and from the entry position moving the cutting tip laterally with the cutting tip inserted into the opening at a first depth past a height of the foil; and
(b) using a blunt protrusion, push the at least two flaps downwards into the reagent reservoir to clear at least part of the opening of the reagent reservoir.

19. The computer-readable medium comprising transitory or non-transitory data representing a computer program, the computer program comprising instructions for causing a processor system to perform the method according to claim 18.

* * * * *